Oct. 3, 1967 J. J KIMMEL ET AL 3,345,093
COUPLING FOR SHAFTS AND THE LIKE
Filed Feb. 16, 1965 2 Sheets-Sheet 1
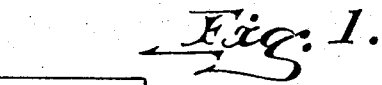
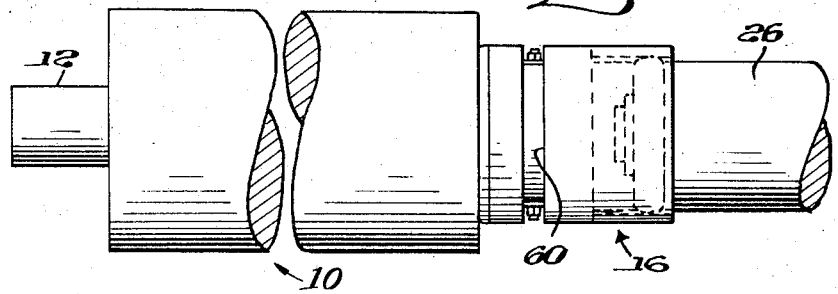
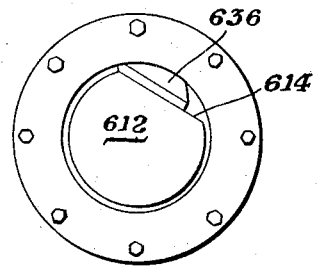
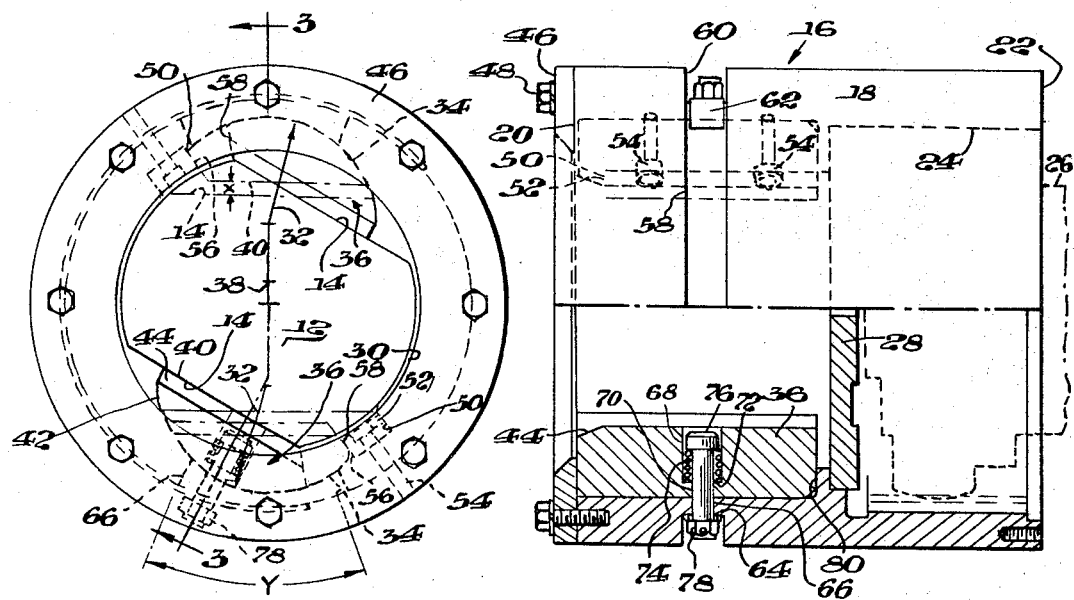
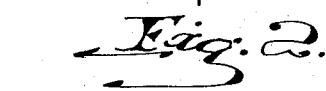
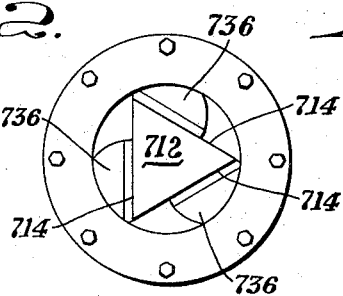
INVENTORS.
JOSEPH J. KIMMEL,
KENNETH K. CARMAN.
BY
Oscar B Brumback
their ATTORNEY INVENTORS.
JOSEPH J. KIMMEL,
KENNETH K. CARMAN.
BY
Oscar B Brumback
their
ATTORNEY.

United States Patent Office 3,345,093
Patented Oct. 3, 1967

3,345,093
COUPLING FOR SHAFTS AND THE LIKE
Joseph J. Kimmel, Baltimore, and Kenneth K. Carman, Ellicott City, Md., assignors to Koppers Company, Inc., a corporation of Delaware
Filed Feb. 16, 1965, Ser. No. 432,951
5 Claims. (Cl. 287—52.09)

ABSTRACT OF THE DISCLOSURE

Apparatus for connecting a flexible gear-type coupling to the end of a shaft such as, for example, a spindle coupling to the neck of a mill roll in a steel rolling mill. The apparatus comprises a sleeve member joined to or formed integral with the coupling sleeve, the sleeve member having a pair of diametrically opposed arcuate recesses in which a corresponding pair of circumferentially linked arcuate wedge blocks are retained. The wedge blocks each have flat surfaces opposite their arcuate surfaces for engagement with corresponding flat surfaces formed on the roll neck. The geometry of the mating arcuate surfaces it such that, upon rotation of the mill roll the wedge blocks are forced into wedging engagement with the sleeve member. Upon counter-rotation of the mill roll, the wedge blocks unlock from the arcuate recesses thus forming a clearance between the flat surfaces of the blocks and the roll neck to facilitate axial removal of the roll neck from the sleeve member. Stops are provided to prevent locking in the opposite direction upon counter-rotation of the mill roll.

This invention relates to couplings for shafts and more particularly to couplings utilizing arcuate shaped blocks interposed between the inner wall of a sleeve like coupling member and the shaft to prevent relative rotation between the shaft and the coupling.

It is necessary, in steel rolling mills, particularly in mills rolling strip and foil, to frequently remove the rolls from the mills to renew the roll finish. Often these rolls are removed several times each day. It is, therefore, advantageous to use the sleeve like coupling illustrated and described in Patent No. 2,883,838 entitled "Coupling for Shafts and the Like," issued to George Veitch, Jr. that permits the rolls to be rapidly disconnected and removed from the drive shaft. While the couplings of Patent No. 2,883,838 works well in practice, it has been found in certain instances where the coupling is utilized with rolls of substantial size or where the rolls and coupling are subjected to substantial torques, that the wedge blocks tend to jam in the operating or locked position. To disengage the coupling and disconnect the roll, under ordinary circumstances all that is required is that the mill be stopped and the drive reversed so that the wedge blocks return to a neutral position in the arcuate seats. The neutral position is one in which the stub shaft is not clamped by the wedge blocks. When the mill is reversed there is, however, a relatively small inertia to be overcome and the rolls have a tendency to rotate easily in the reverse direction. If the wedge blocks are jammed in a locked position, the reversal of the mill is ineffective to return the wedge blocks to a neutral position. It has been the practice in the past when the wedge blocks are jammed to suddenly apply a high magnitude reverse torque while the rolls are still in motion so that the wedge blocks return to the neutral position in the arcuate seats and the coupling may then be disengaged from the roll. It has been found, however, when reverse torque is applied under these conditions, that the wedge blocks break free suddenly and the torque applied to the roll drives the wedge blocks beyond the neutral position in the arcuate seat and jams the wedge blocks in the arcuate seats on the opposite side of the neutral position. In certain installations where a substantial torque is applied to release the wedge blocks, the sudden release can damage the coupling.

Briefly, the coupling herein described includes wedge blocks and arcuate seats that are geometrically proportioned to minimize jamming of the wedge blocks in an operating or locked position. The coupling also includes a stop means for the wedge blocks that prevents rotation of the wedge blocks beyond a neutral position when unlocked. The coupling further includes a means to maintain the wedge blocks in corresponding positions within the arcuate seats to facilitate the repositioning of the stub shaft therein. It has been discovered by geometrically proportioning the wedge blocks and the arcuate seats therefor that the tendency for the wedge blocks to jam in an operating condition is minimized and it is therefore a feature of this invention to geometrically proportion the wedge blocks and arcuate seats to minimize jamming of the wedge blocks in an operating or locked position.

In order to prevent the wedge blocks from rotating past the neutral position in the arcuate seat and jamming on the opposite side of the arcuate seat, it is another feature of this invention to provide a stop means within the arcuate seat that abuts a portion of the wedge block in the neutral position and prevents rotation of the wedge block beyond the neutral position in the arcuate seat when moved from the operating or locked position.

It is another feature of this invention to provide a device for maintaining the wedge blocks diametrically opposed and in abutting relation with the arcuate seats to thereby minimize the problems encountered in repositioning the stub shaft within the coupling.

These and other features of the invention will become apparent as this description proceeds in conjunction with the accompanying drawings.

In the drawings:

FIGURE 1 is a view in side elevation illustrating the improved coupling connected to the projecting end of a roll shaft.

FIGURE 2 is a view in end elevation of the improved coupling illustrating in full lines the shaft and wedge blocks in locked position and in phantom lines in an unlocked neutral position.

FIGURE 3 is an enlarged view partially in section taken along the lines 3—3 in FIGURE 2 of the improved coupling illustrated in FIGURE 2.

FIGURE 6 is a view similar to FIGURE 2 of another embodiment of the invention, and FIGURE 7 is a view similar to FIGURE 2 of still another embodiment of the invention.

Figure 4:
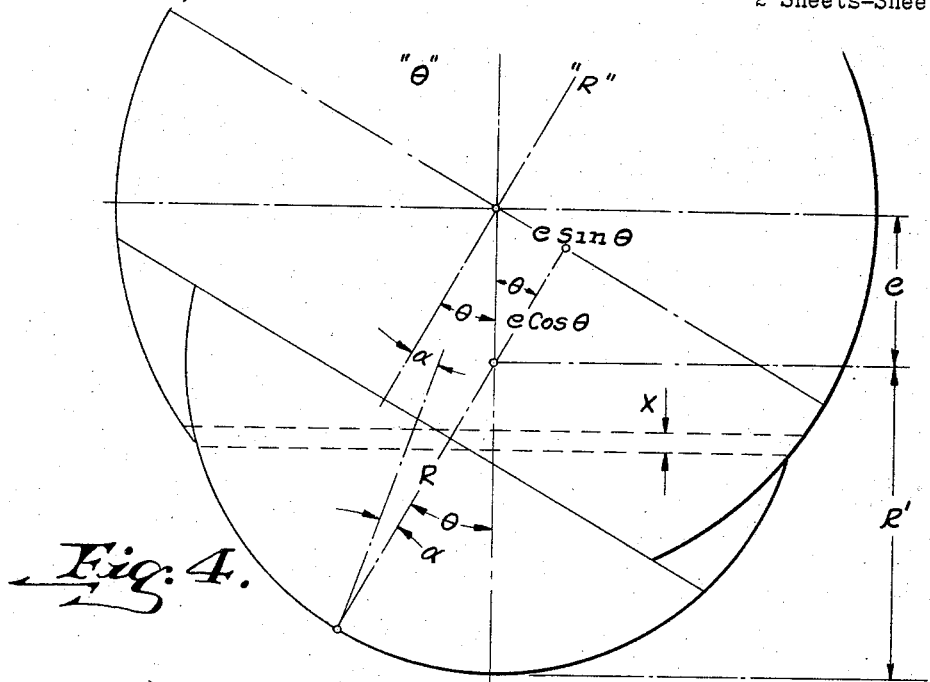
FIGURE 4 is a schematic diagram illustrating the geometric relationship of the stub shaft and the wedge block in the arcuate seat.
Figure 5:
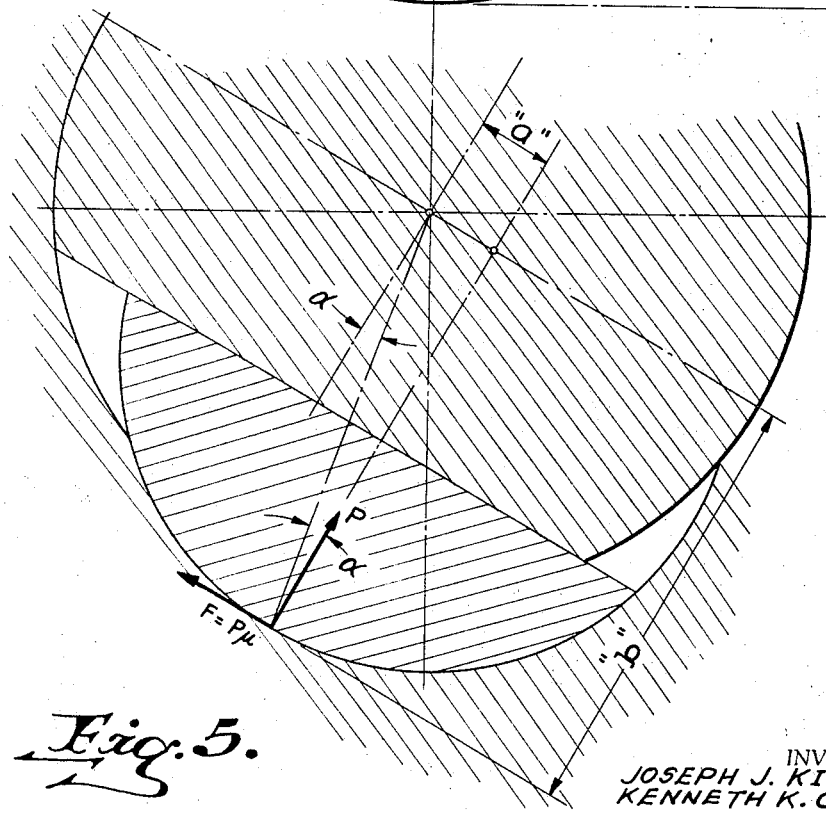
FIGURE 5 is a schematic force diagram of the wedge block in its locked or operative position.

The rolling mill designated as 10 in FIGURE 1 has a pair of projecting stub shafts 12. One stub shaft is shown to be connected by the novel coupling 16 to a drive shaft 26 that provides rotation through coupling 16 to the mill roll 10. Shafts 12 have, as shown in FIGURE 2, flat portions 14 that serve as a means whereby the coupling generally designated 16 grips the shaft for rotation thereof.

The rear wall 22 of the body portion 18 of coupling 16 has an internally splinned bore 24 extending into the body portion 18. A mating splined portion of drive shaft 26 is positioned within the bore 24 and abuts an intermediate wall 28 within the coupling body portion 18.

The front wall 20 of the coupling 16 has a circular bore 30 therein dimensioned so that the stub shaft 12 fits snugly therein. Struck on radii 32 are a pair of arcuate seats 34 for wedge blocks generally designated by the numeral 36. The radii 32 of the arcuate seats 34 are struck on a diametrical line passing through the center of the bore 30, as indicated by the diametrical line 38 of bore 30. The wedge blocks 36 have inner surfaces 40 that abut the shaft flat portions 14 and arcuate sides 42 that fit in the arcuate seats 34 of coupling body portion 18. At one juncture of inner surface 40 and arcuate side 42 the wedge blocks 36 have a longitudinal flat surface 58. The arcuate shape of the blocks 36 conforms substantially to the shape of the arcuate seats 34. The wedge blocks 36 have a chamfered front edge 44 to permit the stub shaft end portions to more easily pass therebetween. The wedge blocks 36 are maintained within the arcuate seats 34 by means of the annular cap member 46 secured by means of cap screws 48 to the body portion 18 front face 20.

With this arrangement the wedge blocks 36 are free to rotate on the arcuate seats and are maintained within the coupling body portion 18. The relative position of the shaft flat portions 14 and wedge block inner face 40 is illustrated in a neutral position by the dotted lines of FIGURE 2. It should be noted that in a neutral position there is a space, indicated by the letter X in FIGURE 2, between the inner surface 40 of wedge block 36 and the shaft flat portion 14. When the coupling 16 is rotated in a counterclockwise direction as viewed in FIGURE 2, the shaft flat portions 14 contact the wedge block flat surfaces 40 and rotate the wedge blocks 36 in the arcuate seats 34 until the blocks 36 are wedged between the arcuate seats 34 and the shaft flat portions 14. Thus the stub shaft 12 is clamped tightly between the pair of wedge blocks 36 and the greater the torque applied to the coupling, the tighter the stub shaft 12 is clamped between the wedge blocks 36. To unlock the stub shaft from the coupling 16, the coupling 16 is rotated in a clockwise direction as viewed in FIGURE 2 so that the stub flat surfaces 40 urge the wedge blocks to the neutral position illustrated by the dotted lines in FIGURE 2. In the neutral position the stub shaft may be easily removed from the coupling 16.

As previously discussed, one of the difficulties encountered with known coupling having arcuate seats and wedge blocks therein is the wedge blocks moving beyond the neutral position and locking in a position beyond neutral. To eliminate this difficulty, a pair of diametrically opposed longitudinal keyways 50 is provided in the coupling body portion that opens into the internal bore 30. Keys 52 are positioned in the keyways 50 and are secured therein by means of cap screws 54. The keyway is arranged so that it has a side surface 56 that abuts the flat surface 58 of the wedge members 36 when the wedge members 36 are in a neutral position, as indicated by dotted lines in FIGURE 2. In a neutral position the keyway surface 56 abuts the wedge flat surface 58. With this arrangement the keys 52 limit rotation of the wedge members 36 in the arcuate seats 34 beyond neutral position in a shaft unlocked direction. This stop means limits the heretofore discussed difficulties of the stub shaft rotating the wedge blocks beyond the neutral position and locking the wedge blocks against the opposite side of the arcuate seat.

It should be understood in lieu of the keyway and the separate key, that it is within the scope of the invention to so shape the arcuate seat 34 that the wedge members 36 cannot rotate beyond the neutral position when unlocked.

There is also provided in the improved coupling device a means for connecting the wedge blocks to each other. As previously discussed, in a neutral position there is a clearance, indicated by the letter X, between the flat surface 14 of shaft 12 and the flat surface 40 of the wedge blocks 36. When the coupling 16 is unlocked from the stub shaft 12, the wedge blocks 36 may not remain diametrically opposed and they may not remain in abutting relation with the arcuate seat thus making reinsertion of the stub shaft 12 difficult. Under these conditions it has been necessary in the past to manually reposition the wedge blocks 36 in a neutral position before the stub shaft 12 is reinserted therein.

A position retention device is provided in the improved coupling 16 to maintain the wedge blocks 36 in abutting relation with the arcuate seats 34 and to maintain the wedge blocks diametrically opposed. This device includes an annular recess 60 in the external portion of the coupling body 18. The recess 60 is positioned approximately midway between the ends of the wedge blocks. An annular semicircular band 62 is positioned in the annular recess 60 and has a pair of apertures 64 therethrough. The coupling body portion has a pair of circumferential slots 66 extending a distance indicated in FIGURE 2 by the letter Y. The wedge blocks 36 have a radial enlarged bore 68 extending part way therethrough and a bore 70 of reduced diameter in overlying relation with the arcuate slot 66 in coupling body portion 18. Between the bores 68 and 70 a shoulder 72 is formed as a seat for a coil spring 74. A bolt 76 extends through bores 68 and 70 in wedge block 36 and through the circumferential slot 66 and the aperture 64 in the band 62. The spring 74 is positioned between the shoulder 72 and the bolt head portion. A nut 78 is threadedly secured to the bolt 76 and compresses the spring 74 to maintain the wedge block in abutting relation with the arcuate seat 34, and the wedge blocks 36 are connected to each other by means of the band 62 to maintain the blocks diametrically opposed.

In assembly, the keys 52 are secured in the keyways by the cap screws 54. The wedge blocks 36 are positioned within the body portion bore 30 and abut a rear shoulder portion 80. The cap screws 76 with the springs 74 positioned thereon are positioned in the bores 68 and 70, and slot 66, and then through the apertures 64 in the band 62. Nuts 78 are secured to the bolts 76 to maintain the wedge blocks 36 in abutting relation with the arcuate seats 34 and in proper diametrically opposed relation to each other. The annular cap member 46 is then secured to the body portion 18 by means of cap screws 48 to maintain the wedge blocks 36 properly positioned within the body portion bore 30.

While the foregoing has illustrated the invention as utilizing an even number of wedge blocks, the invention is likewise operable with an odd number of wedge blocks. FIGURE 6, for example, illustrates an embodiment of the invention wherein one wedge block 636 is used. The stub shaft 612 has then only one flat portion 614. FIGURE 7 illustrates an embodiment wherein three wedge blocks 736 are used. The stub shaft 712 thus has three flat sides 714 which provides an additional advantage in that the stub shaft 712 is automatically centered in the coupling by action of the wedge blocks 736 acting on it in three directions.

We claim:
1. A coupling for a shaft having diametrically opposed flat portions adjacent its ends comprising,
  a body portion having a longitudinal bore of substantially the same diameter as said shaft so that said shaft end portion fits snugly therein,
  a pair of diametrically opposed longitudinal arcuate recesses formed in said bore, said arcuate recesses struck on radii shorter than the radius of said bore and on a diametrical line passing through the center of said bore, the ends of said recesses forming pairs of diametrically opposed junctures with said bore,
  a longitudinal abutment means formed in each arcuate recess adjacent one of the junctures of a pair of said junctures,
  wedge blocks having flat inner surfaces complementary with said shaft flat portions, an outer arcuate surface complementary with said arcuate recesses and a surface adjacent the junction of said flat inner surface and said outer arcuate surface complementary with a surface of said abutment means, said wedge blocks arranged upon relative rotation of said shaft and said body portion in a first direction to move in said arcuate recess into wedging engagement between said shaft and said body portion, said abutment means arranged to prevent movement of said wedge blocks into wedge engagement between said shaft and said body portion upon relative rotation of said shaft and said body portion in an opposite second direction, and means extending around a portion of the external surface of said body portion connecting said wedge blocks to each other so that said wedge blocks remain in diametrically opposed spaced relation to each other, said means being slidable relative to said body portion so that said wedge blocks are movable in said arcuate recesses upon rotation of said body portion relative to said shaft.

2. A coupling for a shaft having diametrically opposed flat portions adjacent its ends comprising, a body portion having a longitudinal bore of substantially the same diameter as said shaft so that said shaft end portion fits snugly therein, a pair of diametrically opposed longitudinal arcuate recesses formed in said bore, said arcuate recesses struck on radii shorter than the radius of said bore and on a diametrical line passing through the center of said bore, the ends of said recesses forming pairs of diametrically opposed junctures with said bore, a longitudinal recess formed in said body portion longitudinal bore adjacent each one of the junctures of a pair of said junctures, elongated rectangular key members secured in said longitudinal recesses and extending into said arcuate recesses, and wedge blocks having a flat inner surface complementary with said shaft flat portions, an outer arcuate surface complementary with said arcuate recess and a surface adjacent the juncture of said flat inner surface and said outer arcuate surface complementary with a portion of said key member extending into said arcuate recess, said wedge blocks arranged upon relative rotation of said shaft and said body portion in a first direction to move in said arcuate recess into wedging engagement between said shaft and said body portion, said rectangular key members arranged to prevent movement of said wedge blocks into wedging engagement between said surfaces of said body portion upon relative rotation of said shaft and said body portion in an opposite second direction.

3. A coupling for a shaft as set forth in claim 2 in which said diametrically opposed longitudinal recesses each include a pair of spaced radially extending threaded bores, said elongated key members each having a pair of spaced lateral passageways therethrough, said elongated key members constructed so that said passageways overlie said threaded bores, and bolt means extending through said passageways into said bores to thereby secure said key members in said recesses.

4. A coupling for a shaft having diametrically opposed flat portions adjacent its ends comprising, a body portion having a longitudinal bore of substantially the same diameter as said shaft so that said shaft end portion fits snugly therein, a pair of diametrically opposed longitudinal arcuate recesses formed in said bore, said arcuate recesses struck on radii shorter than the radius of said bore and on a diametrical line passing through the center of said bore, the ends of said recesses forming pairs of diametrically opposed junctures with said bore, a longitudinal abutment means formed in each arcuate recess adjacent one of the junctures of a pair of said junctures, and a wedge block in each of said arcuate recesses, said blocks having flat inner surfaces complementary with said shaft flat portions, an outer arcuate surface complementary with said arcuate recesses and a surface adjacent the junction of said flat inner surface and said outer arcuate surface complementary with a surface of said abutment means, said wedge blocks arranged upon relative rotation of said shaft and said body portion in a first direction to move in said arcuate recess into wedging engagement between said shaft and said body portion, said abutment means arranged to prevent movement of said wedge blocks into wedge engagement between said shaft and said body portion upon relative rotation of said shaft and said body portion in an opposite second direction, said abutment means including elongated stop members secured to said body portion within said bore and having portions extending into each of said arcuate recesses.

5. A coupling for a shaft having at least three flat portions adjacent its end, comprising, a body portion having a longitudinal bore of substantially the same diameter as said shaft so that said shaft end portion fits snugly therein, at least three longitudinal substantially arcuate recesses formed in said bore, said recesses being struck on a radius shorter than the radius of said bore and on a line passing through the center of said bore, the ends of said recesses forming junctures with said bore, a longitudinal abutment means formed in each arcuate recess adjacent one of said junctures, and at least three wedge blocks each having a flat inner surface complementary with said shaft flat portion and a substantially arcuate outer surface complementary with said arcuate recess and a surface adjacent the juncture of said flat inner surface and said outer arcuate surface complementary with a surface of said abutment means, said wedge blocks being arranged in said bore upon relative rotation of said shaft and said body portion in a first direction to move in said arcuate recesses away from said stop means into wedging engagement between said shaft and said body portion, and upon rotation of said shaft and said body portion in a second opposite direction to move into engagement with said abutment means, means extending around a portion of the external surface of said body portion connecting said wedge blocks to each other so that said wedge blocks remain in spaced relation to each other, said means being slidable relative to said body portion so that said wedge blocks are movable in said arcuate recesses upon rotation of said body portion relative to said shaft.

References Cited

UNITED STATES PATENTS

| 863,051 | 8/1907 | Craufurd | 287—52.09 XR |
| 989,696 | 4/1911 | Conti | 192—45.1 |
| 1,844,382 | 2/1932 | Dardelet | 287—52.09 XR |
| 2,226,524 | 12/1940 | Runge et al. | 287—52.09 |
| 2,459,785 | 1/1949 | Allerton | 287—136 |
| 2,883,838 | 4/1959 | Veitch | 287—114 XR |
| 3,107,764 | 10/1963 | Fulton | 192—41 |

CARL W. TOMLIN, *Primary Examiner.*

A. V. KUNDRAT, *Assistant Examiner.*